United States Patent
Zhou

(10) Patent No.: US 9,396,201 B2
(45) Date of Patent: Jul. 19, 2016

(54) METHOD OF DATA SORTING

(71) Applicant: Wistron Corporation, New Taipei (TW)

(72) Inventor: Bin Zhou, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 273 days.

(21) Appl. No.: 14/219,044

(22) Filed: Mar. 19, 2014

(65) Prior Publication Data

US 2015/0112952 A1 Apr. 23, 2015

(30) Foreign Application Priority Data

Oct. 17, 2013 (CN) .......................... 2013 1 0488192

(51) Int. Cl.
*G06F 7/00* (2006.01)
*G06F 17/30* (2006.01)

(52) U.S. Cl.
CPC .... *G06F 17/30123* (2013.01); *G06F 17/30289* (2013.01); *G06F 17/30339* (2013.01); *G06F 17/30507* (2013.01)

(58) Field of Classification Search
None
See application file for complete search history.

(56) References Cited

U.S. PATENT DOCUMENTS

| 7,216,124 B2 * | 5/2007 | Meaden | G06F 1/30958 |
| 7,818,740 B2 * | 10/2010 | Bankston | G06F 8/65 707/638 |
| 8,375,020 B1 * | 2/2013 | Rogers | G06F 17/30038 707/708 |
| 8,639,670 B2 * | 1/2014 | Mineno | G06F 17/30569 707/692 |
| 2005/0091035 A1 * | 4/2005 | Kaplan | G06F 17/22 704/8 |

FOREIGN PATENT DOCUMENTS

TW 200945067 A 11/2009

OTHER PUBLICATIONS

Kuo et al, "Generating Paired Transliterated-cognates Using Multiple Pronunciation Characteristics from Web Corpora", PACLIC 18, Dec. 8-10, 2004, Waseda University, Tokyo, 8 pages.*
TW Office Action dated May 8, 2015 in corresponding TW application (No. 102138073).
Partial English translation of TW Office Action dated May 8, 2015 in corresponding TW application (No. 102138073).

* cited by examiner

*Primary Examiner* — Uyen Le
(74) *Attorney, Agent, or Firm* — McClure, Qualey & Rodack, LLP

(57) ABSTRACT

A method of data sorting is provided. The method at least includes setting a classification rule in a table of t_file for a database of a computer-readable storage medium, wherein the computer-readable storage medium at least includes a receiving unit, a processing unit and a storage unit. The receiving unit receives multiple files having file names. The processing unit processes the file names according to the classification rule to generate multiple conversion codes corresponding to the file names. The storage unit stores the conversion codes in the table of t_file for corresponding to the file names. The storage unit orderly stores the conversion codes according to a predetermined order of the classification rule.

22 Claims, 2 Drawing Sheets

METHOD OF DATA SORTING

This application claims the benefit of People's Republic of China application Serial No. 201310488192.0, filed Oct. 17, 2013, the subject matter of which is incorporated herein by reference.

BACKGROUND OF THE DISCLOSURE

1. Field of the Disclosure

The disclosure relates in general to a method of data sorting, and more particularly to a method of data sorting capable of solving the problem of sorting difference between different databases.

1. Description of the Related Art

The data stored in the database of a computer system has many different categories, such as special symbols, pure Arabic numerals, English letters and characters of East Asian languages (such as traditional/simplified Chinese characters, Japanese characters and Korean characters), or other languages. Currently, the default sorting orders between different databases may not be the same, and cannot satisfy specific needs. For instance, when a user would like to use a personal computer (PC) terminal, an Apple tablet PC or an -iPad terminal to obtain the structure code of the content stored at a server terminal, the user can browse the content of the database stored at the server terminal through the web. Since the database stored at the PC terminal and the database stored at the iPad terminal may not be sorted by the same order, the sorting results may be different and the user may be confused with data inquiry.

Let a sql server 2008 and a sqlite database be taken for example. Suppose string: {'065', '12', 'abc', '@', 'ab12c', '+', 'Zhang San', 'Li Si'} is to be inquired. According to the sql server 2008 database, the default sorting order is: {'@', '+', '065', '12', 'ab12c', 'abc', 'Zhang San', 'Li Si'}. According to the sqlite database, the default sorting order is: {'+', '065', '12', '@', 'ab12c', 'abc', 'Zhang San', 'Li Si'}. The default sorting orders are not the same for the two databases. Two databases would have different sorting results with regard to special characters, pure Arabic numerals and Chinese names. If the sorting difference is resolved by having the codes re-written in the program, the sorting task will become terrifically complicated, and the program performance will be reduced, thereby having impact on the user experience.

SUMMARY OF THE DISCLOSURE

The disclosure is directed to a method of data sorting enabling the different databases to simply and effectively sort data by the same order, thereby solving the problem of sorting difference between different databases, and having no undesirable effect on the system efficiency during data inquiry.

According to one embodiment of the present disclosure, a method of data sorting is provided. The method at least comprises:

setting a classification rule in a table of t_file for a database of a computer-readable storage medium, wherein the computer-readable storage medium at least comprises a receiving unit, a processing unit and a storage unit;

the receiving unit receiving a plurality of files having file names;

the processing unit processing the file names according to the classification rule to generate a plurality of conversion codes corresponding to the file names; and the storage unit storing the conversion codes in the table of t_file for corresponding to the file names;

wherein the storage unit stores the conversion codes orderly according to a predetermined order of the classification rule.

The above and other aspects of the disclosure will become better understood with regard to the following detailed description of the preferred but non-limiting embodiment (s). The following description is made with reference to the accompanying drawings.

DETAILED DESCRIPTION OF THE DISCLOSURE

A method of data sorting is provided in an embodiment of the disclosure. The method enables different databases to simply and effectively sort data by the same order. Meanwhile, the inquiry results obtained from different databases have the same sorting and system efficiency is not affected during data inquiry.

Detailed descriptions of relevant embodiments are disclosed with reference to accompanying diagrams. It should be noted that detailed steps and diagrams of the disclosed embodiments are exemplary and explanatory only, and are not restrictive of the disclosed embodiments as claimed. The scope of protection of the disclosure is not limited to the descriptions of the disclosed embodiments.

Figure 1:
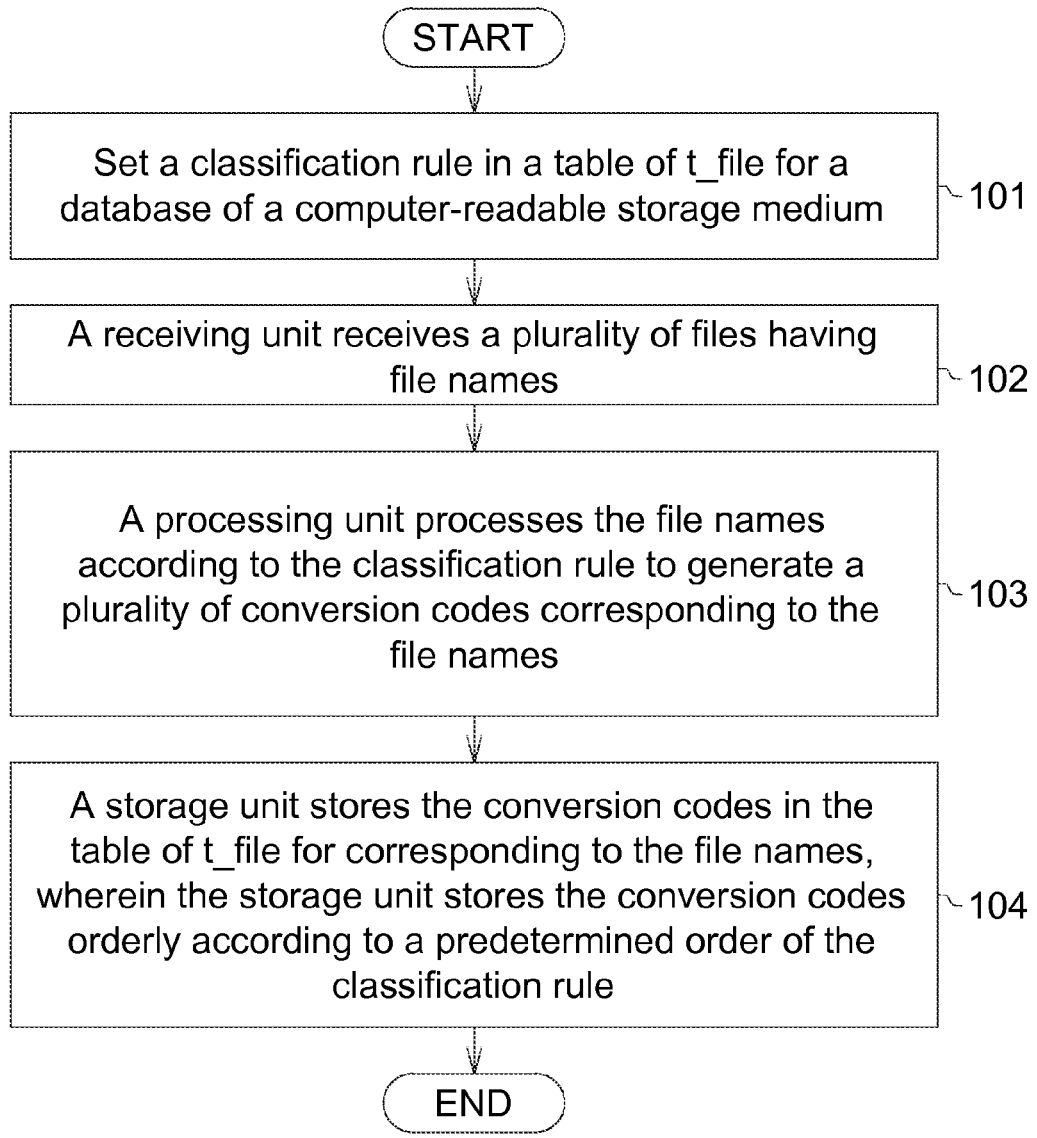
FIG. 1 is a flowchart of a method of data sorting according to an embodiment of the disclosure.

FIG. 1 a flowchart of a method of data sorting according to an embodiment of the disclosure. In step 101, a classification rule is set in a table of t_file of a computer-readable storage medium. For instance, the classification rule is set in a table of t_file name, such that the file names can be sorted according to the classification rule. The computer-readable storage medium comprises a receiving unit, a processing unit and a storage unit. In step 102, the receiving unit receives a plurality of files having file names. In step 103, the processing unit processes the file names according to the classification rule to generate a plurality of conversion codes corresponding to the file names. In step 104, the storage unit stores the conversion codes in the table of t_file for corresponding to the file names, wherein the storage unit orderly stores the conversion codes according to a predetermined order of the classification rule. The method of data sorting of the present embodiment enables different databases to sort data by the same order, thereby solving the problem of sorting difference between different databases.

In an embodiment, the computer-readable storage medium refers to any medium with which the user can read and store data on a computer system. Exemplarily but not restrictively, the computer-readable storage medium comprises a computer storage medium and a communication medium, and can be realized by a volatile or nonvolatile, removable or non-removable medium implemented by any methods or technologies for storing information such as computer readable instructions, data structure, program module or other data. Examples of the computer storage medium are such as but not limited to RAM, ROM, EEPROM, flash memory or other memory technologies; CD-ROM, digital versatile disc (DVD) or other optical storage device; cassette tape, tape, disc storage device or other magnetic storage device; or any other media which are computer readable and can be used for storing information. The communication medium normally executes computer readable instructions, data structure, program modules or other data of modulated data signal, such as carrier or other transmission mechanisms. The communication medium comprises any information delivery media. The modulated data signal refers to the signal with one or more characteristics being set or changed by encoding signal information. Exemplarily but not restrictively, the communication medium comprises cabled medium (such as wired network or direct-wired connection), wireless medium (such as sound, radio frequency (RF), infrared light), and other wireless media. Any of the above combinations can be included in the scope of the computer storage medium.

Figures 2, 3A, 3B:
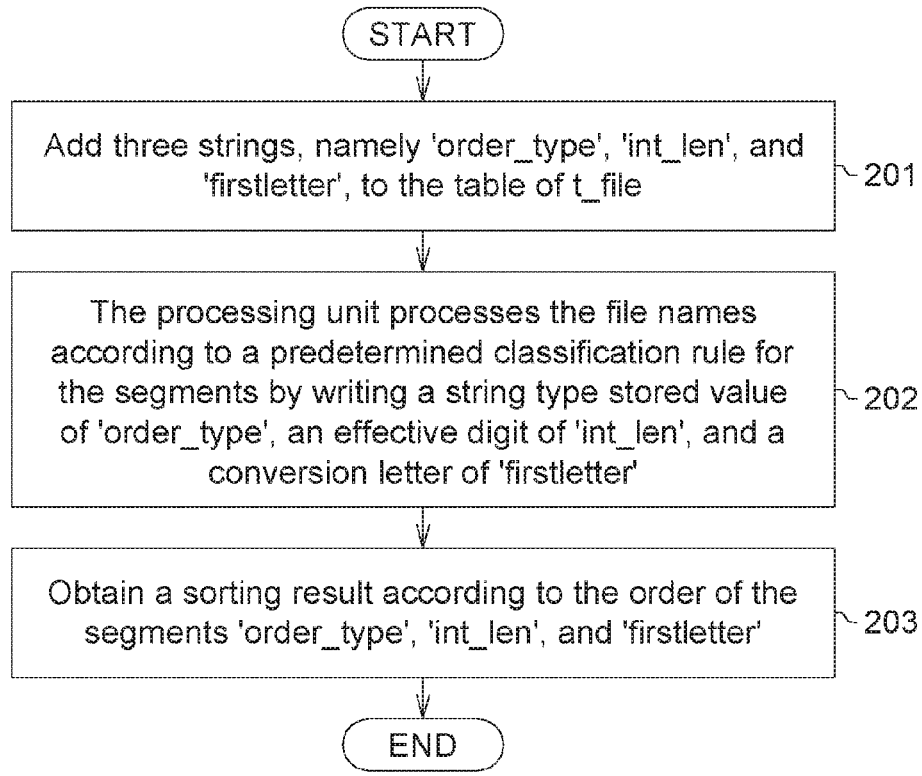
FIG. 2 is a flowchart of a method of sorting file names in a table of t_file according to an embodiment of the disclosure.
FIG. 3A and FIG. 3B shows the changes in the table of t_file before and after the classification rule of an embodiment of the disclosure being added to the table of t_file.

FIG. 2 is a flowchart of a method of sorting file names in a table of t_file according to an embodiment of the disclosure. Please refer to FIG. 1 and FIG. 2.

In an embodiment, the classification rule is set in a table of t_file, and comprises a string type identification, a digital string identification, and a string conversion identification. In step 201 of FIG. 2, three strings, namely 'order_type', 'int_len', and 'firstletter', are added to the table of t_file, wherein the 'order_type' segment is for identifying the string type, the 'int_len' segment is for identifying the digit string, and the 'firstletter' segment is for performing the string conversion.

In step 202, the processing unit processes the file names according to a predetermined classification rule for the segments by writing a string type stored value to complete the string type identification 'order_type', writing an effective digit to complete the digital string identification 'int_len', and writing a conversion letter to complete the string conversion identification 'firstletter.' The storage unit further orderly stores the identification results according to a predetermined order. In step 203, the results are obtained according to the order of the segments 'order_type', 'int_len', and 'firstletter'.

FIG. 3A and FIG. 3B shows the changes in the table of t_file before and after the classification rule of an embodiment of the disclosure being added to the table of t_file. According to an embodiment of the disclosure, the table of t_file further comprises a classification rule. For instance, three strings are added to the table of t_file (as shown in FIG. 3B), wherein the storage contents of the segments 'order_type', 'int_len', and 'firstletter' are integer, integer and text, respectively.

In an embodiment, according to the string type identification 'order_type', the file name initialed with a special character is determined as a first type stored value, the file name initialed with a pure Arabic numeral is determined as a second type stored value, and the file name initialed with a string other than special characters and pure Arabic numerals is determined as a third type stored value. Based on a predetermined order of the classification rule, data sorting is performed according to the order of the first type stored value, the second type stored value and the third type stored value.

In an embodiment to considerate the overall order of special characters, pure Arabic numeral, and other strings (such as English and Chinese), the initial character/string of a file name can be divided into three types in the string type identification 'order_type', which are special character, pure Arabic numeral and other string, as indicated in Table 1.

TABLE 1

| Initial character/string of a file name | Stored value in the string type identification 'order_type' |
|---|---|
| Special character | 1 |
| Pure arabic numeral | 2 |
| Other string | 3 |

In practical application, according to users' request or preference for file sorting, the predetermined order of the classification rule can be changed by adjusting the string type stored value. For instance, if the first, the second, and the third type stored values are set as 1, 2, and 3 as indicated in Table 1, the sorting results of the file names by using the method of the present embodiment are: special character, pure Arabic numeral, and other string. If the first, the second, and the third type stored values are set as 2, 1, and 3, the sorting results of the file names by using the method of the present embodiment are: pure Arabic numeral, special character, and other string.

In an embodiment, the file name with an English or Chinese initial is classified as other string and determined as a third type stored value. In response to users' request of other languages such as Japanese, German or Russian, these languages can be combined into the third type stored value, or classified as a fourth (even fifth, . . . ) type stored value. The quantity of the types of stored values and the classification corresponding to the initial character/string of the file name are not limited to the three types exemplified in the present embodiment, and can be appropriately adjusted or set according to the overall order of arrangement according to actual needs.

In an embodiment as indicated in step 201, 202, a digital string identification ('int_len') column is added to the table of t_file for determining quantity of effective bits when the string is pure Arabic numeral. The stored values of the digital string identification 'int_len' are indicated in Table 2.

TABLE 2

| Characters of a file name | Stored value of the digital string identification 'int_len' |
|---|---|
| Pure arabic numerals | Quantity of effective bits |
| Other string | 0 |

If the file name is composed of pure Arabic numeral, then the stored value of 'int_len' is a quantity of effective bits. Such arrangement means all 0s preceding the digits are ignored. For instance, if the string of the file name is 003, then the quantity of effective bits is 1 and the stored value of 'int_len' is 1 (00 are not effective bit). If the string of the file names is 0203, then the quantity of effective bits is 3 and the stored value of 'int_len' is 3. If the string of the file names is 203, then the quantity of effective bits is 3 and the stored value of 'int_len' is also 3.

In an embodiment, based on a predetermined order of the classification rule in a table of t_file, the file name initialed with a pure Arabic numeral is sorted according to the order of the determined value of quantity of effective bits. If two file names each being initialed with a pure Arabic numeral are 065 and 00203, respectively, then the quantities of effective bits of the file names are 2 and 3, respectively, and the values of effective bits are 65 and 203, respectively. Based on the predetermined order of the present embodiment, the file names are sorted according to a descending order of the determined values of effective bits, that is, 065 is ranked before 00203.

In an embodiment as indicated in steps 201 and 202, a string conversion identification ('firstletter') column is added to the table of t_file for orderly converting file names into English letters and/or digits by the order of bits according to a fixed rule, such that the identified file names are converted to generate conversion codes corresponding to the file names, respectively, and are then orderly arranged according to the characteristics of the bits. The so called 'orderly arranged according to the characteristics of the bits' can be exemplified below by two character strings of 'A161' and 'AB03'. When comparing the two character strings by using the database of the present embodiment, the first characters 'A' and 'A' of the two character strings are identified first and are found to be equal to each other. Then, the two character strings are compared with each other according to the second characters '1' and 'B'. Since '1' is ranked before 'B', it is determined that 'A161' is ranked before 'AB03', and there is no need to identify and compare the subsequent characters.

Table 3 illustrates the rule of string conversion identification according to an embodiment.

TABLE 3

| Characters of a file name | Stored value of 'firstletter' |
|---|---|
| Special characters | Each special character is converted into an ANSI 6-bit decimal code (each converted code having less than 6 bits is filled with 0s; 6 bits is sufficient for coding each special character) |
| English letters | Each English letter is capitalized (for instance, Bc is converted into BC. Special condition: character a or A is converted into AA to be differentiated from the capital letter A obtained through the conversion of "digits in a string" disclosed below) |
| Chinese characters | The first letter of the English pinyin of each Chinese character is converted into the small letters (for instance: 'Zhang San' is converted into 'zs', 'Li Si' is converted into 'ls'.) |
| Digits in a string | Each effective digit is converted into A (the first letter of the alphabet) plus an ANSI decimal code (for instance, b12c is converted into BA49A50C.) |
| Pure arabic numeral | Each pure arabic numeral is converted into effective digits (for instance, 003 is converted into 3; 0203 is converted into 203.) |

In an embodiment, special characters of a file name can be converted into corresponding character codes according to a coding scheme and used as a stored value of the string conversion identification 'firstletter'. Exemplarily but not restrictively, the coding scheme is American National Standards Institute (ANSI) code, or Unicode (Unicode/Unicode standard), or other coding scheme such as American Standard Code for Information Interchange (ASCII) code, or Extended ASCII (EASCII) code.

Unicode is a standard used in the field of computer science for processing most writing systems in the world. By using the Unicode, computer can display and process text more conveniently. Unicode, based on the standard of universal character set, is continually amended and keeps incorporating more new characters. Unicode is applicable to different areas or countries and can be used for selecting a suitable coding scheme capable of supporting different character sets. ASCII code is a computer coding system based on Latin letters, and is mainly used for displaying modern English. EASCII code, being an extended version of ASCII, can support some other Western European languages.

Based on a specific rule of string conversion identification according to an embodiment, the stored values of special characters in the 'firstletter' column are illustrated in Table 3. Each special character of each file name can be converted into an ANSI 6-bit decimal code, and the code less than 6 bits is filled with '0' to generate a corresponding character code, wherein 6 bits is sufficient for coding each special character. However, the disclosure is not limited thereto. In an embodiment, the symbol of '+', being a special character, is converted into an ANSI 6-bit decimal code as 000043 (43 is preceded by 0000); the symbol of '@', being a special character, is converted into an ANSI 6-bit decimal code as 000064 (64 is preceded by 0000).

In an embodiment, based on a predetermined order of the classification rule in a table of t_file, sorting is performed according to corresponding character codes. For instance, the character code 000043 converted from the symbol of '+' is ranked before the character code 000064 converted from the symbol of '@'.

In an embodiment, each English letter of a file name is capitalized. The content of corresponding converted character code is used as the stored value of the 'firstletter' of a file name. For instance, Bc is converted into BC, computer is converted into computer.

Special condition: The character a or A is converted into AA to be differentiated from the capital letter A obtained through the conversion of 'digits in a string' disclosed below.

In an embodiment, each effective digit in a string of a file name is converted into A, the first letter of the alphabet, plus an ANSI decimal code. For instance, the file names of d12e can be converted into DA49A50E, wherein '1' is converted into 'A49'; '2' is converted into 'A50'; 'd' is converted into English capital letter 'D'; 'e' is converted into English capital letter 'E'.

In an embodiment, based on a predetermined order of the classification rule in a table of t_file, the converted English capital letters are sorted according to the alphabetical order. For instance, corresponding characters in some file names are coded and sorted as follows:

Corresponding character code of the file name abc is AABC after conversion;

Corresponding character code of the file name ab1 is AABA49 after conversion;

Corresponding g character code of the file name ab2 is AABA50 after conversion;

Corresponding character code of the file name ab12c is AAB A49A50C after conversion.

The file names are sorted according to the alphabetical order of English capital letters converted from the stored values of the 'firstletter', and the sorting result is: ab1→ab12c→ab2→abc.

In an embodiment, each Chinese character of a file name can be converted into the small letter of the first letter of English pinyin (which means phonetic transcription) according to a pinyin system and used as a corresponding character code of the file name and stored in the 'firstletter' column of the file name. The pinyin system is not subjected to any particular restrictions, and can be realized by such as Hanyu (which means Chinese character) pinyin, Tongyong (which means common use) pinyin, or other pinyin system. In an embodiment, the conversion of Chinese file names is exemplified by using the Hanyu pinyin system.

For instance, the Hanyu pinyin of the file name 'Zhang San' is 'Zhāng Sān'. Since the first letter of each pinyin of the file name in small letter is 'zs', the stored value of 'firstletter' is 'zs'. The Hanyu pinyin for the file name 'Li Si' is 'Lǐ Sì'. Since the small letter of the first letter of each pinyin is 'ls', the stored value of 'firstletter' is 'ls'.

In an embodiment, based on a predetermined order of the classification rule in a table of t_file, the Chinese characters of a file name are sorted by the small letter of the first letter of each pinyin according to the alphabetical order of English letters. For instance, the corresponding character codes of the file names 'Zhang San' and 'Li Si' (that is, the stored value of the 'firstletter') are converted into 'zs' and 'ls' and the sorting result is: Li Si→Zhang San.

In an embodiment, pure Arabic numeral of each file name can be converted into effective digits used as corresponding character code and stored in the 'firstletter' column of the file name. For instance, the file names 003 is converted into effective digit 3; the file names 0203 is converted into effective digit 203; the file names 0052 is converted into effective digit 52; the effective digit of the file name 600 is still 600.

As indicated in FIG. 2, columns such as 'order_type', 'int_len', 'firstletter' are added to a corresponding table of t_file. In step 203, inquiries are made according to the order of segments 'order_type', 'int_len', and 'firstletter', and the inquiry results are as exemplified in disclosed examples. Data inquiry is made with reference to such as: select *from t_file order by order_type, int_len, firstletter.

Table 4 illustrates the sorting and stored values of a plurality of file names according to corresponding conversion of the segments 'order_type', 'int_len', and 'firstletter'.

TABLE 4

| File-name (file_name) | String type identification ('order_type') | Digital string identification ('int_len') | String conversion identification ('firstletter') |
|---|---|---|---|
| + | 1 | 0 | 000043 |
| @ | 1 | 0 | 000064 |
| 12 | 2 | 2 | 12 |
| 065 | 2 | 2 | 65 |
| ab12c | 3 | 0 | AABA49A50C |
| abc | 3 | 0 | AABC |
| Li Si | 3 | 0 | ls |
| Zhang San | 3 | 0 | zs |

The method of data sorting disclosed in the present embodiment can be used in different databases for sorting the strings according to (the sorting method used in different databases must be the same): special characters (fixed order), pure Arabic numerals (actual digits are sorted according to an ascending order), English (insensitive to capital letter and small letter), Chinese (sorted according to the first letter of each pinyin). In an example, when file names with strings {'065', '12', 'abc', '@', 'ab12c', '+', 'Zhang San', 'Li Si'} are inquired, the file names are sorted according to the conversion and sorting method disclosed in the present embodiment and the sorting result of inquiry is: {'+', '@', '12', '065', 'ab12c', 'abc', 'Li Si', 'Zhang San'}. In another example, when the inquired file names do not have any pure Arabic numerals, there is no need to perform digital string identification ('int_len'), and only string type identification ('order type') and string conversion identification ('firstletter') are performed. For instance, when the file names with strings {abc', 'ab12c', 'Zhang San', '@', '+', 'Li'} are inquired, the file names are sorted according to the conversion and sorting method disclosed in the present embodiment and the sorting result of inquiry is: {'+', '@', 'ab12c', 'abc', 'Li Si', 'Zhang San'}.

The method of data sorting of the present embodiment can achieve at least the effects as below:
1. The arrangements of special characters are the same in two databases.
2. The databases arrange the digits according to the comparison by bits. Take the numbers of 065 and 12 for example. The value of 065 is greater than 12. Since the initial number of 065 being 0 is less than the initial number of 12 being 1, the number 065 is ranked before the number 12 according to an ascending order according to the sorting method of the present embodiment. Conversely, the present embodiment compares the numbers and ranks 12 before 065.
3. Chinese characters are sorted according to the small letter of the first letter of each pinyin. For instance, the small letter of the first letters of 'Zhang San' are 'zs', and the first letters of 'Li Si' is 'ls'. By using the sorting method of the present embodiment, the file name 'Li Si' is ranked before the file name 'Zhang San'.

According to the method of data sorting disclosed in above embodiments, a classification rule is set in a table of t_file for sorting data according to users' needs (not limited to the classification method and segment augmentation disclosed in the embodiment of the disclosure), such that different databases can be simply and effectively sorted by the same order. Since each database sorts letters and digits by the same order, the inquiry results obtained from different databases still follow the same sorting, hence resolving the problem of sorting difference between different databases. Furthermore, during inquiry, the method of data sorting of the embodiment of the disclosure does not require complicated structured query language (SQL) sentences or consume extra system resources for re-sorting. Therefore, inquiry performance is assured and system efficiency is not affected by data inquiry.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of data sorting, at least comprising:
setting a classification rule in a table of t_file for a database of a computer-readable storage medium, wherein the computer-readable storage medium at least comprises a receiving unit, a processing unit and a storage unit;
the receiving unit receiving a plurality of files having file names;
the processing unit processing the file names received by the receiving unit according to the classification rule to generate a plurality of conversion codes corresponding to the file names; and
the storage unit storing the conversion codes generated by the processing unit in the table of t_file for corresponding to the file names,
wherein the storage unit orderly stores the conversion codes according to a predetermined order of the classification rule and the table of t_file records a relationship between the file names and the classification rule.

2. The method according to claim 1, wherein the classification rule comprises a string type identification process, a digital string identification process, and a string conversion identification process.

3. The method according to claim 2, wherein the string type identification process comprises: determining a file name initialed with a special character as a first type stored value, determining a file name initialed with a pure Arabic numeral as a second type stored value, and determining a file name initialed with a string other than a special character and a pure Arabic numeral as a third type stored value.

4. The method according to claim 3, wherein based on the predetermined order of the classification rule, sorting is performed according to the first type stored value, the second type stored value and the third type stored value.

5. The method according to claim 3, whereof the file names with English or Chinese initial are determined as the third type stored value.

6. The method according to claim 3, wherein the digital string identification process comprises: determining the quantity of effective bits when the string of the file name is determined as the pure Arabic numeral.

7. The method according to claim 6, wherein the string conversion identification process comprises: converting the file names into English letters and/or digits according to a fixed rule, such that the identified file names are respectively converted to generate conversion codes corresponding to the file names.

8. The method according to claim 3, wherein the string conversion identification process comprises: converting the file names into English letters and/or digits according to a fixed rule, such that the identified file names are respectively converted to generate conversion codes corresponding to the file names.

9. The method according to claim 2, wherein the digital string identification process comprises: determining the quantity of effective bits when the string of the file name is determined as the pure Arabic numeral.

10. The method according to claim 9, wherein based on the predetermined order of the classification rule, the pure Arabic numerals of the file names are sorted according to the determined values of effective bits.

11. The method according to claim 2, wherein the string conversion identification process comprises: converting the file names into English letters and/or digits according to a fixed rule, such that the identified file names are respectively converted to generate conversion codes corresponding to the file names.

12. The method according to claim 2, wherein the string conversion identification process comprises: converting each special character of the file name into a character code corresponding to the special character according to a coding scheme.

13. The method according to claim 12, wherein the coding scheme is American National Standards Institute (ANSI) code or Unicode.

14. The method according to claim 12, wherein each special character of each file name is converted into an ANSI 6-bit decimal code, and the code less than 6 bits is filled with 0s to generate a character code corresponding to the special character.

15. The method according to claim 12, wherein based on the predetermined order of the classification rule, sorting is performed according to the ranking of corresponding character codes.

16. The method according to claim 2, wherein the string conversion identification process comprises: capitalizing each English letter of each file name.

17. The method according to claim 16, wherein the string conversion identification process further comprises: converting each English letter a or A of each file name into AA.

18. The method according to claim 16, wherein based on the predetermined order of the classification rule, the converted English letters in capital letters are sorted according to the alphabetical order of English letters.

19. The method according to claim 2, wherein the string conversion identification process comprises: converting the first letter of the English pinyin system corresponding to each Chinese character of each file name into small letter.

20. The method according to claim 19, wherein the English pinyin system is a Hanyu pinyin system or a Tongyong pinyin system.

21. The method according to claim 19, wherein based on the predetermined order of the classification rule, the Chinese characters of each file name are sorted according to alphabetical order of the first letters of the Chinese characters of each file name converted by the English pinyin system.

22. The method according to claim 2, wherein the string conversion identification process comprises: converting each effective digit in the string of each file name into A, the first letter of the alphabet, plus an ANSI decimal code.

* * * * *